United States Patent
Lewis et al.

(10) Patent No.: US 10,408,071 B2
(45) Date of Patent: Sep. 10, 2019

(54) BOAS THERMAL PROTECTION

(71) Applicant: United Technologies Corporation, Hartford, CT (US)

(72) Inventors: Scott D. Lewis, Vernon, CT (US); Dominic J. Mongillo, Jr., West Hartford, CT (US); Mark F. Zelesky, Bolton, CT (US); Bret M. Teller, Meriden, CT (US); Russell Deibel, Glastonbury, CT (US); Matthew S. Gleiner, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 696 days.

(21) Appl. No.: 15/022,725

(22) PCT Filed: Aug. 26, 2014

(86) PCT No.: PCT/US2014/052596
§ 371 (c)(1),
(2) Date: Mar. 17, 2016

(87) PCT Pub. No.: WO2015/041806
PCT Pub. Date: Mar. 26, 2015

(65) Prior Publication Data
US 2016/0230577 A1 Aug. 11, 2016

Related U.S. Application Data

(60) Provisional application No. 61/879,322, filed on Sep. 18, 2013.

(51) Int. Cl.
*F01D 11/24* (2006.01)
*F01D 9/04* (2006.01)
(Continued)

(52) U.S. Cl.
CPC ............. *F01D 9/041* (2013.01); *F01D 5/02* (2013.01); *F01D 11/08* (2013.01); *F01D 11/24* (2013.01);
(Continued)

(58) Field of Classification Search
CPC ... F01D 9/04; F01D 9/041; F01D 9/06; F01D 9/065; F01D 11/24; F01D 11/10; F01D 11/08; F01D 25/12; F01D 11/20
See application file for complete search history.

(56) References Cited

U.S. PATENT DOCUMENTS 3,628,880 A * 12/1971 Smuland ................. F01D 5/189
415/175
4,522,557 A 6/1985 Bouiller
(Continued)

OTHER PUBLICATIONS

European Search Report for European Patent Application No. 14845261.8 completed Mar. 17, 2017.
International Search Report for International Patent Application No. PCT/US2014/052596 completed Dec. 4, 2014.
International Preliminary Report on Patentability for PCT Application No. PCT/US2014/052596 completed Mar. 22, 2016.

*Primary Examiner* — Woody A Lee, Jr.
*Assistant Examiner* — Sabbir Hasan
(74) *Attorney, Agent, or Firm* — Carlson, Gaskey & Olds, P.C.

(57) ABSTRACT

A vane according to an exemplary aspect of the present disclosure includes, among other things, a platform extending from an edge face and between spaced apart lateral faces and an airfoil extending outwardly from the platform. The platform includes at least one ejection port in the edge face and at least one passage connected to the at least one ejection port.

20 Claims, 5 Drawing Sheets

(51) Int. Cl.
*F04D 29/54* (2006.01)
*F04D 29/58* (2006.01)
*F01D 5/02* (2006.01)
*F01D 11/08* (2006.01)
*F02C 3/04* (2006.01)
*F04D 29/32* (2006.01)

(52) U.S. Cl.
CPC .............. *F02C 3/04* (2013.01); *F04D 29/321* (2013.01); *F04D 29/542* (2013.01); *F04D 29/584* (2013.01); *F05D 2220/32* (2013.01); *F05D 2240/11* (2013.01); *F05D 2240/12* (2013.01); *F05D 2240/35* (2013.01); *F05D 2240/80* (2013.01); *F05D 2240/81* (2013.01); *F05D 2250/12* (2013.01); *F05D 2260/201* (2013.01); *Y02T 50/676* (2013.01)

(56) References Cited

U.S. PATENT DOCUMENTS

| | | | |
|---|---|---|---|
| 4,820,116 A | 4/1989 | Hovan et al. | |
| 5,399,065 A | 3/1995 | Kudo et al. | |
| 6,036,436 A | 3/2000 | Fukuno et al. | |
| 6,254,333 B1 * | 7/2001 | Merry | F01D 5/187 29/889.2 |
| 7,246,989 B2 * | 7/2007 | Glasspoole | F01D 11/24 415/1 |
| 8,296,945 B2 * | 10/2012 | Broomer | B23P 6/005 29/889.1 |
| 2006/0123794 A1 | 6/2006 | Glasspoole | |
| 2008/0131260 A1 | 6/2008 | Lee | |
| 2012/0134785 A1 | 5/2012 | Khanin et al. | |

* cited by examiner

ABOAS THERMAL PROTECTION

CROSS-REFERENCE TO RELATED APPLICATION

This application claims priority to U.S. Provisional Application No. 61/89,322, filed Sep. 18, 2013.

BACKGROUND

This disclosure relates to a gas turbine engine, and more particularly to a vane for cooling thermal protection of a blade outer air seal (BOAS).

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

A typical turbine section includes at least one array of stator vanes and one array of BOAS each arranged circumferentially about an engine central longitudinal axis to define an outer radial flow path boundary for the hot combustion gases passing across exposed surfaces of the BOAS. Thus, the BOAS are prone to thermal distress due to the hot combustion gases. Each of the stator vanes includes an airfoil which communicates a relatively high pressure fluid downstream of the airfoil and onto an exposed surface of one of the BOAS, making a portion of the exposed surface especially prone to thermal distress.

Typically, BOAS are cooled by communicating bleed air from the compressor section to an inner plenum of the BOAS, which results in a parasitic loss due to gases being heated by the compressor section but not being combusted. The BOAS are cooled along the entire circumferential direction because the relative circumferential position of each of the upstream vane airfoil segments and relative position of combustor fuel nozzle locations may be unknown. Accordingly, a localized cooling feature is desirable to minimize parasitic losses.

SUMMARY

A vane according to an exemplary aspect of the present disclosure includes a platform extending from an edge face and between spaced apart lateral faces. An airfoil extends outwardly from the platform. The platform includes at least one ejection port in the edge face and at least one passage connected to the at least one ejection port.

In a further embodiment of any of the foregoing embodiments, the platform includes two or more ejection ports each connected to a common one of the at least one passage.

In a further embodiment of any of the foregoing embodiments, the edge face is a trailing edge face.

In a further embodiment of any of the foregoing embodiments, the trailing edge face defines a localized cooling region distributed about a cooling plane extending in an axial direction from the trailing edge. A localized concentration of the at least one ejection port in the localized cooling region being greater than a total concentration of the at least one ejection port in the trailing edge face.

In a further embodiment of any of the foregoing embodiments, the localized cooling region is evenly distributed about the cooling plane.

In a further embodiment of any of the foregoing embodiments, each of the localized concentration and the total concentration is defined as a total cross-sectional area of the at least one ejection port located in a respective one of the localized cooling region and the trailing edge face.

In a further embodiment of any of the foregoing embodiments, each surface of the trailing edge face adjacent the localized cooling region is free of any of the at least one ejection port.

In a further embodiment of any of the foregoing embodiments, the edge face includes a non-uniform distribution of the at least one ejection port across a span between the lateral faces.

In a further embodiment of any of the foregoing embodiments, the passage is configured to eject coolant in a direction that impinges an exposed surface of a blade outer air seal.

In a further embodiment of any of the foregoing embodiments, the at least one passage defines a coolant axis perpendicular to the edge face.

In a further embodiment of any of the foregoing embodiments, the at least one passage defines a coolant axis intersecting the edge face at an acute angle.

In a further embodiment of any of the foregoing embodiments, the at least one ejection port defines a rectangular cross section.

A gas turbine engine according to an example of the present disclosure includes a compressor section, a combustor section, and a turbine section including a plurality of stator vanes and a plurality of blade outer air seals each arranged circumferentially about an engine axis to define a flow path. Each of the stator vanes includes a platform extending from an edge face and between spaced apart lateral faces, and an airfoil extending outwardly from the platform. The platform includes at least one ejection port in the edge face and at least one passage connected to the at least one ejection port. Each of the at least one passage is configured to eject coolant in a direction that impinges an exposed surface of one of the blade outer air seals.

In a further embodiment of any of the foregoing embodiments, each of the platforms defines a first width and each of the blade outer air seals defines a second width different from the first width, each of the first and second widths extending in a circumferential direction about the engine axis.

In a further embodiment of any of the foregoing embodiments, the turbine section includes a first quantity of the airfoil and a second quantity of the blade outer air seals different from the first quantity.

In a further embodiment of any of the foregoing embodiments, each of the blade outer air seals is positioned downstream from one of the stator vanes with respect to the flow path.

In a further embodiment of any of the foregoing embodiments, the exposed surface is a localized cooling area spaced a distance from spaced apart lateral edges of the blade outer air seals.

A method of cooling an engine component according to an example of the present disclosure includes ejecting a coolant from at least one passage defined by a platform of a stator vane in a direction that impinges an exposed surface of a blade outer air seal adjacent the stator vane.

In a further embodiment of any of the foregoing embodiments, the coolant is ejected onto a targeted region of the exposed surface, the targeted region defining a cooling width less than one-half a segment width defined by spaced apart lateral edges of the blade outer edge seal.

In a further embodiment of any of the foregoing embodiments, the targeted region is located adjacent to an airfoil of the stator vane.

These and other features disclosed herein can be best understood from the following specification and drawings, the following of which is a brief description.

DETAILED DESCRIPTION

Figure 1:
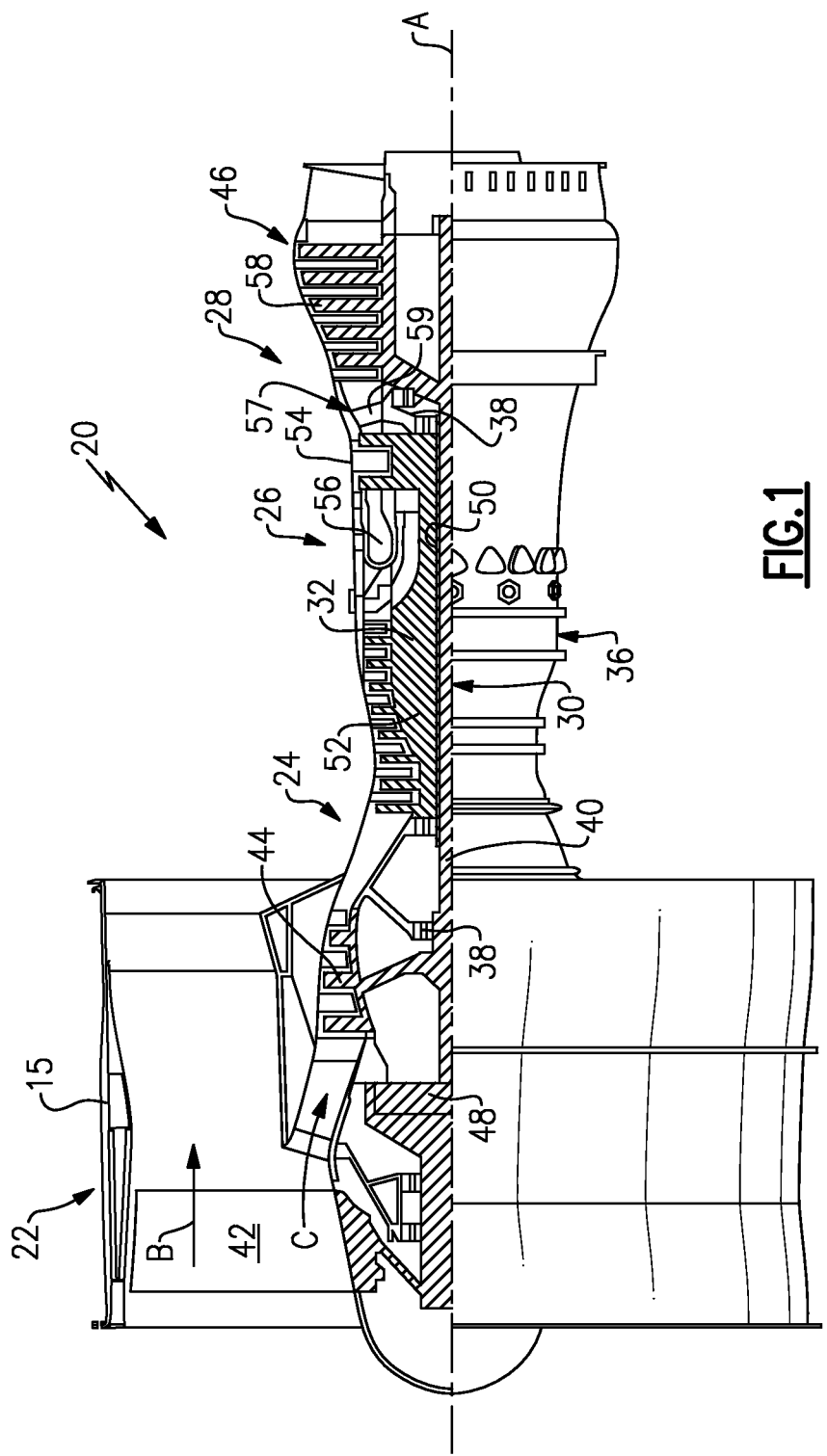
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° R)]^{0.5}$. The "Low corrected fan tip speed" as disclosed herein according to one non-limiting embodiment is less than about 1150 ft/second.

Figure 2:
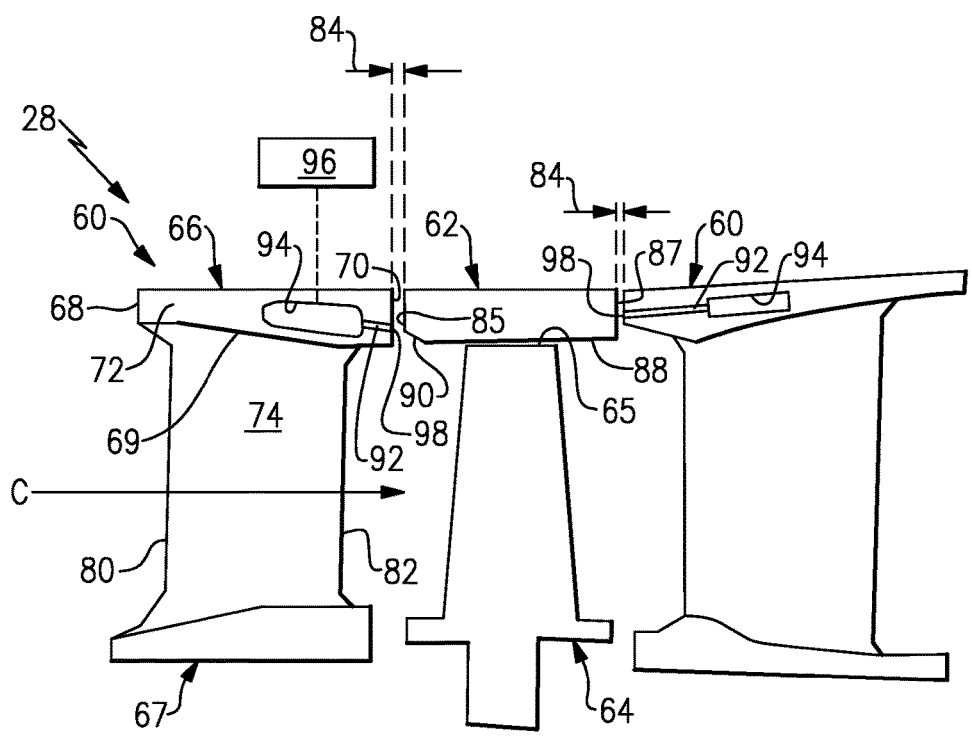
FIG. 2 illustrates a schematic view of a vane and blade outer air seal (BOAS) arrangement.

FIG. 2 illustrates a highly schematic view of a vane and blade outer air seal (BOAS) for a gas turbine engine 20. In this example, the vane is a stator vane 60 for a turbine section 28. The stator vane 60 can be located in at least one of the low pressure turbine and high pressure turbine sections 46, 54, and an intermediate pressure turbine section of a three-spool engine. However, it is to be understood that other types of vanes, other components arranged downstream from an airfoil, other parts of the gas turbine engine 20, and other systems such as ground based systems can benefit from the examples disclosed herein which are not limited to the design shown.

The turbine section 28 includes at least one array of stator vanes 60 and at least one array of BOAS 62 each arranged circumferentially about an engine axis A to define an outer radial flow path boundary for a core flow path C. Each of the stator vanes 60 includes an outer platform 66 and an inner platform 67 spaced apart from each other in the radial direction with respect to the engine axis A. The platform 66 extends between a leading edge face 68 and a trailing edge face 70 spaced apart from each other in the axial direction along the engine axis A, and also between a pair of lateral mate faces 72 spaced apart from each other circumferentially.

An airfoil 74 extends in the radial direction between the platforms 66, 67 to direct flow of hot combustion gases along the core flow path C. The airfoil 74 defines a leading edge 80 and a trailing edge 82 spaced apart from each other in a chordwise direction. The airfoil 74 defines a pressure side 76 and a suction side 78 (shown in FIG. 6).

The stator vanes 60 and BOAS 62 can be spaced apart from each other in the axial direction along the engine axis A to define a chordal seal region 84. Also, each of the BOAS 62 can be spaced apart from each other circumferentially to define an intersegment gap 86 therebetween (shown in FIG. 6). Each of the BOAS 62 includes an exposed surface 88 spaced apart radially from a tip 65 of a rotor blade 64. In one example, each of the BOAS 62 defines a chamfer 90 adjacent to the exposed surface 88 to redirect fluids from the chordal seal region 84.

The BOAS 62 are prone to thermal distress due to the hot combustion gases along the core flow path C. Accordingly, each outer platform 66 defines one or more passages 92 configured to eject coolant in a direction that impinges the exposed surface 88 of one of the BOAS 62. The coolant reduces the temperature of a portion of the exposed surface 88 and surrounding portions of the BOAS 62. In one example, each of the passages 92 opens to the trailing edge face 70 of the platform 66. In another example, the outer platform 66 defines at least one passage 92 opening to the leading edge face 68 of the outer platform 66. In yet another example, the outer platform 66 defines one or more passages 92 opening to the trailing edge face 70 and the leading edge face 68.

A coolant source 96 (shown schematically) communicates coolant to a plenum 94 defined by the outer platform 66. In one example, the coolant source 96 is the compressor section 24 which communicates bleed air to the plenum 94. Generally, the bleed air is at a lower temperature relative to the hot combustion gases adjacent to the exposed surface 88. However, other coolant sources are contemplated, including an auxiliary cooling source and other components of the aircraft. A coolant source can also provide leakage air to each chordal seal region 84 and intersegment gap 86 to cool the areas of the BOAS 62. In other examples, the passages 92 can be configured to direct relatively high pressure coolant from the leading edge face 68 of the stator vane 60 to a rear face 87 of the BOAS 62 to prevent ingestion of relatively low pressure hot combustion gases into the chordal seal region 84. Additionally, various geometries and locations of the plenum 94 with respect to the vane 60 are contemplated. In some examples, the plenum 94 can also provide coolant to various components of the stator vanes 60, including convection cooling of the outer platform 66 and impingement cooling of internal surfaces of the stator vanes 60.

Figure 3:
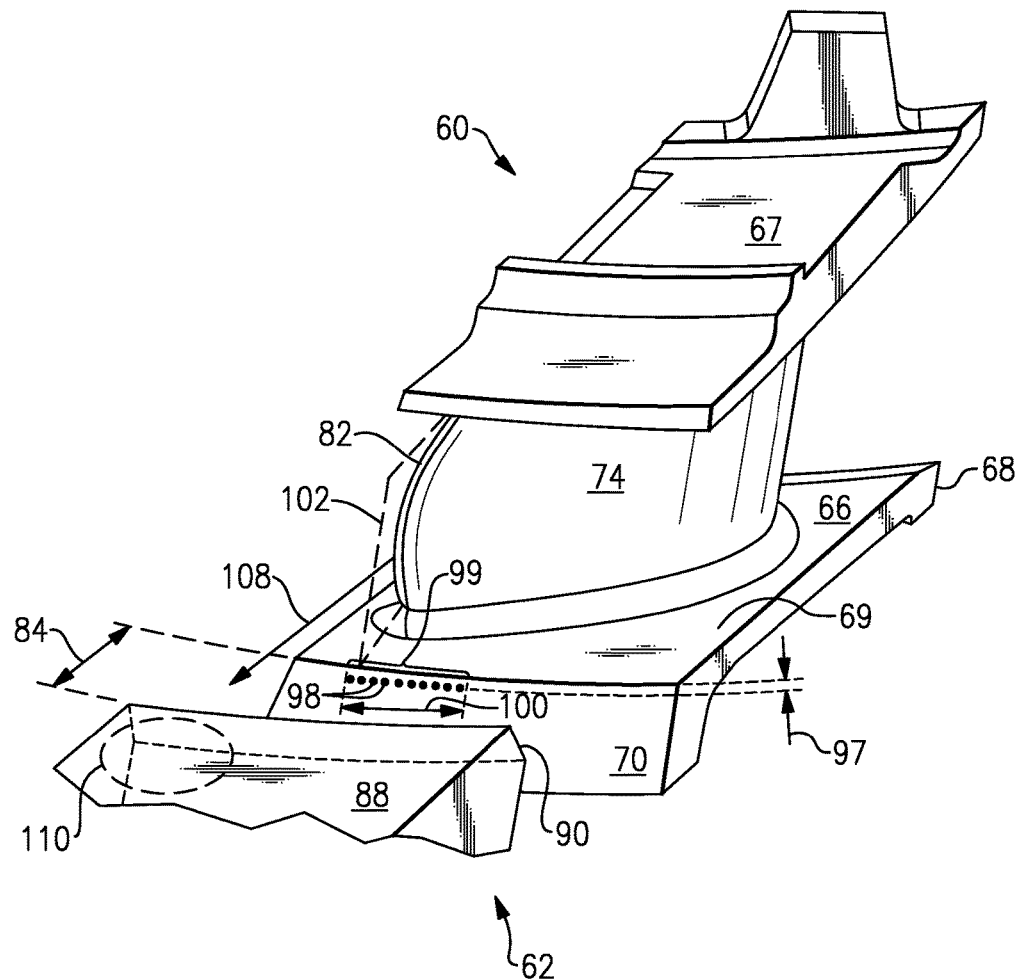
FIG. 3 illustrates a perspective view of the vane and BOAS of FIG. 2.
Figure 4A:
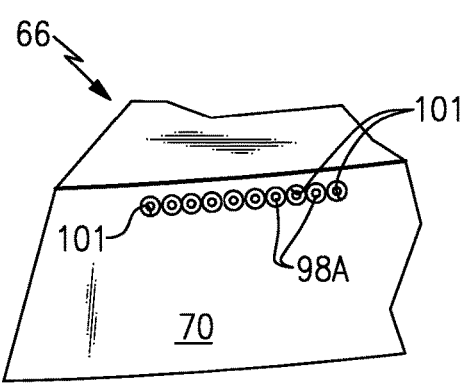
FIG. 4A illustrates an example edge face of a vane.
Figure 4B:
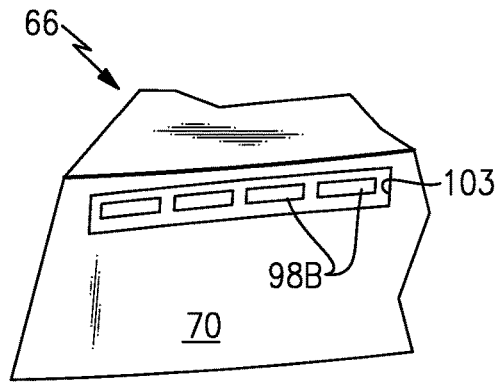
FIG. 4B illustrates a second example of an edge face of a vane.
Figure 4C:
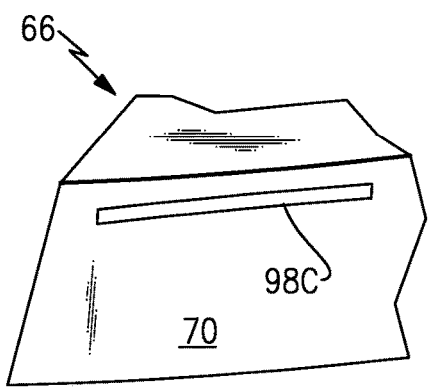
FIG. 4C illustrates a third example of an edge face of a vane.
Figure 4D:
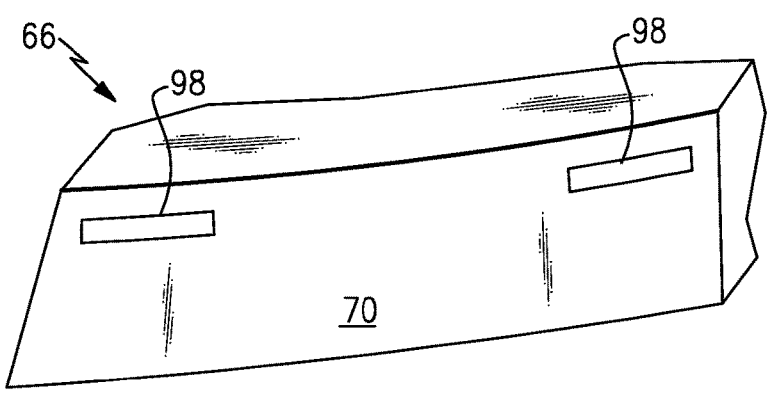
FIG. 4D illustrates a forth example of an edge face of a vane.
Figure 5:
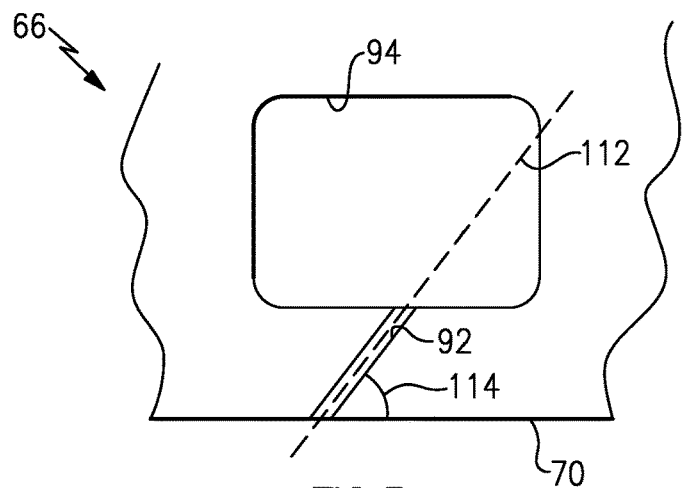
FIG. 5 illustrates a partial cross sectional view of a vane.

Referring to FIG. 3, which illustrates the vane 60 viewed radially outwardly from the engine axis A, the platform 66 defines one or more ejection ports 98 connected to at least one of the passages 92 (shown in FIGS. 2 and 5). In one example, the platform 66 defines at least two ejection ports 98 each connected to a common one of the passages 92. As shown, the trailing edge face 70 can include the ejection ports 98. However, the leading edge face 68 can also include one or more ejection ports 98. Each of the ejection ports 98 can have various geometries. In one example, the ejection ports 98 include a generally circular cross section (shown in FIG. 4A). In another example, the ejection ports 98 include a rectangular cross section or slot (shown in FIGS. 4B and 4C). In some examples, the trailing edge face 70 includes a plurality of passages 92 and ejection ports 98 (shown in FIGS. 2, 4A and 4B). In yet another example, trailing edge face 70 includes one passage 92 and one ejection port 98 (shown in FIG. 4C). In other examples, the passages 92 and ejection ports 98 can each include a uniform area along a coolant axis 112 (shown in FIG. 5). In yet other examples, the passages 92 and ejection ports 98 can each be diffused in a convergent or divergent manner along the coolant axis 112. In further examples, the passages 92 and ejection ports 98 can each include an elliptical configuration consisting of a minor and major axis of any size or proportion along the coolant axis 112. However, other geometries of the passages 92 and ejection ports 98 are contemplated which are configured to eject coolant in a direction that impinges an exposed surface of at least one of the BOAS 62. In some examples, a length of each of the passages 92 includes the same cross sectional geometry as the respective one of the ejection ports 98. In other examples, a length of each of the passages 92 can include a different cross sectional geometry as the respective one of the ejection ports 98. It should be understood that the passages 92 can be arranged in combination with ejection ports 98 having the same or different geometries, including any of the various geometries described herein.

The ejections ports 98 define a localized cooling region 99 from which the coolant is ejected from the passages 92. The localized cooling region 99 is configured such that a localized concentration of ejection ports 98 in the localized cooling region 99 is greater than a total concentration of the ejection ports in the trailing edge face 70. In some examples, the trailing edge face 70 adjacent to the localized cooling region 99 is free of any ejection ports. Concentration can be defined as a total cross-sectional area of the ejection ports 98 located in the respective one of localized cooling region 99 and the trailing edge face 70. In another example, concentration can be based upon a volume or pressure of coolant ejected from the respective one of localized cooling region 99 and the trailing edge face 70.

The localized cooling region 99 is positioned with respect to the arrangement of the airfoil 74. The hot combustion gas flow along the core flow path C separate at the leading edge 80 along the pressure side 76 and suction side 78 of the airfoil 74 and rejoin at the trailing edge 82. Thus, the airfoil 74 generates a relatively high pressure fluid defined by a vector 108 extending in a direction downstream from the trailing edge 82 of the airfoil 74. The relatively high pressure fluid is communicated onto a portion of the exposed surface 88 of a downstream one of the BOAS 62. Thus, a targeted region 110 of the exposed surface 88 receiving the relatively high pressure fluid is subjected to a relatively higher temperature than surrounding areas of the BOAS 62.

In one example, the localized cooling region 99 is positioned about a cooling plane 102 extending from the trailing edge face 70 in the direction of the vector 108. In some examples, the localized cooling region 99 is evenly distributed about the cooling plane 102 circumferentially across a distance 100 between the lateral mate faces 72. In other examples, the localized cooling region 99 is non-uniformly distributed about the cooling plane 102 circumferentially across the distance 100 between the lateral mate faces 72. Distribution of the localized cooling region 99 and positioning the passages 92 can be based upon the specific geometry of the platform 66 and airfoil 74. It should also be understood that the localized region 99 can be positioned a distance 97 from the outer surface 69 of the platform 66 to direct coolant to the targeted regions 110.

Referring to FIG. 5, the orientation of each of the passages 92 can be varied to conform to the orientation of the trailing edge 82 of the airfoil 74. Each of the passages 92 defines a coolant axis 112 extending through the trailing edge face 70. The coolant axis 112 and the trailing edge face 70 define an angle 114 there between. The value of angle 114 is based upon the orientation of the coolant axis 112 relative to the trailing edge face 70. As shown, the orientation of each of the passages 92 varies in the axial direction. In one example, the coolant axis 112 is perpendicular or normal to the trailing edge face 70. In another example, the angle 114 is an acute angle (shown in FIG. 5). In yet another example, the angle 114 is an obtuse angle. The orientation of the passages 92 can also be varied in the radial direction. It should be appreciated that the orientation and location of each of the passages 92 can vary in the circumferential and/or axial directions depending upon the relative angle of the surfaces of the vane 60 and BOAS 62 defining the chordal seal region 84.

Figure 6:
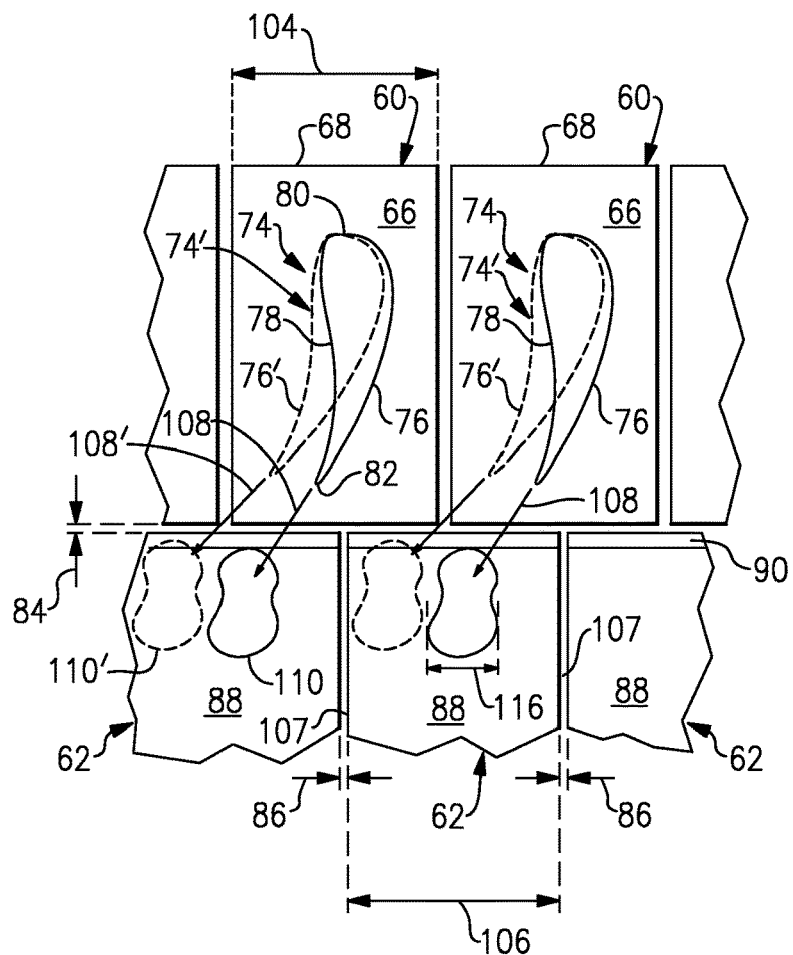
FIG. 6 illustrates a cross sectional view of the vane and BOAS arrangement of FIG. 2.

Referring to FIG. 6, which illustrates a cross sectional view across the airfoils 74 in a direction radially outward from the engine axis A, each of the platforms 66 and the BOAS 62 can define a different width in the circumferential direction. As shown, each outer platform 66 defines a vane platform width 104 in the circumferential direction about the engine axis A, and each BOAS 62 defines a segment width 106 in a circumferential direction different from the vane platform width 104. Thus, in some examples, the turbine section 24 can include a different quantity of stator vanes 60 than BOAS 62, and the position of the BOAS 62 can be offset circumferentially from airfoils 74 and/or platforms 66 of the vanes 60. Therefore, the position of each intersegment gap 86 and each trailing edge 82 can vary due to the relative dimensions of the vane 60 and BOAS 62. In other examples, the turbine section 24 can include a different quantity of airfoils 74 than BOAS 62.

Similarly, the position and geometry of the targeted region 110 can also vary based upon the geometry of the airfoils 74 and the flow of hot combustion gases along the core flow path C. As shown, the targeted region 110 can be spaced a distance from the intersegment gap lateral edges 107 of the BOAS 62 (shown in FIG. 6). In some examples, the targeted region 110 can be next to one of the intersegment gap lateral edges 107. In other examples, the targeted region 110 receiving coolant ejected from the passages 92 defines a cooling width 116 less than 75% the segment width 106 of the BOAS 62. In some examples, the targeted region 110 receiving coolant ejected from the passages 92 defines a cooling width 116 less than 50% the segment width 106 of the BOAS 62. In other examples, the cooling width 116 is less than 25% of the segment width 106. It should be appreciated that the targeted region 110 is subjected to a relatively higher temperature gradient than surrounding areas of the exposed surface 88.

As previously discussed, the vector 108 of the high pressure fluid can also vary based upon the geometry of the airfoil 74. In some examples, a vector 108' generated by one of the airfoils 74' can be directed toward a targeted region 110' of the exposed surface 88 located axially downstream from an adjacent one of the vanes 60. Therefore, the localized cooling region 99 of the adjacent one of the vanes 60 can be positioned to eject coolant onto the targeted region 110' of the BOAS 62. As shown in FIG. 4B, the platform 66 can include at least one group of ejection ports 98 where the high pressure fluid is directed onto the exposed surface 88 near each intersegment gap 86. The arrangement of the ejection ports 98 in this manner provides coolant to the targeted region 110' of the BOAS 62 while minimizing the amount of coolant ingested into each intersegment gap 86. In other examples, the orientation of each of the ejection ports 98 and passages 92 can be offset from the vector 108 and from other ejection ports 98 and passages 92 to minimize turbulence or aerodynamic losses within the core flow path C.

It should be appreciated that the relative distance between the surfaces of the vanes 60 and BOAS 62 can vary due to thermal growth caused by the hot combustion gases C acting upon the vanes 60, BOAS 62 and other structural components of the engine 20. Therefore, the arrangement, distribution of discharge location, quantity, and type of the ejection ports 98 can vary to address positioning of the ejection ports 98 with respect to surfaces of the BOAS 62 in the radial and axial directions. The ejection ports 98 can be distributed in a circumferential direction along a linear straight plane or along an arcuate path with respect to the engine axis A depending on a radial distance of the trailing edge face 70 from the engine axis A and the quantity of platforms 66. The relative radial and circumferential location of the ejection ports 98 along the trailing edge face 70 can also dependent on the relative radial and circumferential location of the targeted regions 110 on the exposed surface 88 of the BOAS 62. To mitigate the potential of coolant flow the ejection ports 98 from being obstructed by the relative positioning of surfaces of the vanes 60 and BOAS 62 along the chordal seal region 84 due to thermal or mechanical growth, pressure loads, vane tipping, and environmental factors such as air particulate, sand, etc., the vanes 60 can include recesses including a plurality of counter sunk holes 101 (shown in FIG. 4A) or a slot 103 (shown in FIG. 4B) from which the ejection ports 98 extend inwardly from. However, other types of recesses are contemplated depending on the configuration of the ejection ports 98 and operating conditions of the engine 20.

The passages 92 can be formed by conventional casting methods, including conventional silica or alumina core, and/or refractory metal core(s) (RMC). Other methods of forming the passages 92 include machining techniques such as water jet machining, laser drilling, electro chemical machining (ECM) and electric discharge machining (EDM). In another example, the passages 92, and in particular a single passage including a rectangular geometry shown in FIG. 4C, can be formed as part of a wax mold to assist in locating a core position of the wax mold to form a hollow feature of an airfoil, since the core position typically terminates at the platform 66 of the vane 60. It should be understood that the vane 60 can be formed with cooling features directed to cooling portions of the vane 60, as well as the passages 92 for ejecting coolant onto an adjacent one of the BOAS 62.

During operation, coolant is supplied from the coolant source 96 to the plenum 94. The coolant is then communicated to the passage 92 and ejected from at least one of the ejection ports 98 onto the targeted region 110 of the BOAS 62, thereby reducing the temperature of the material adjacent to the targeted region 110.

The vane 60 includes many benefits over a BOAS cooling arrangement. One benefit of the vane 60 includes a reduction in the amount of coolant communicated to the BOAS 62, thereby reducing parasitic losses. Additionally, the likelihood of thermal distress of the BOAS 62 is minimized by ejecting coolant from the passages 92 in a direction based upon the geometry of the airfoil 74 concentrates coolant to portions of the BOAS 62 subject to relatively high pressure and temperature fluid in the core flow path C. Moreover, orienting the passages 92 in a direction based upon the geometry of the airfoil 74 minimizes aerodynamic mixing losses. Orienting the passages 92 in a direction based upon the geometry of the airfoil 74 also minimizes ingestion of coolant into the chordal seal region 84 and intersegment gaps 86 by counteracting the high pressure fluid from the airfoil 74, thereby allowing leakage air provided by the coolant source 96 or other sources to cool the areas of the BOAS 62 adjacent to each chordal seal region 84 and intersegment gaps 86. The passages 92 can also augment cooling features of a BOAS 62.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A vane comprising:
   a platform extending from an edge face and between spaced apart lateral faces, wherein said edge face is a trailing edge face extending circumferentially between said lateral faces;
   an airfoil extending outwardly from said platform, said airfoil defining a leading edge and a trailing edge, and said airfoil defining pressure and suction sides;
   wherein said platform includes at least one ejection port in said edge face and at least one passage connected to said at least one ejection port;
   wherein said trailing edge face defines a localized cooling region distributed about a cooling plane extending in an axial direction from said trailing edge such that said cooling plane intersects said trailing edge face, and a localized concentration of said at least one ejection port in said localized cooling region being greater than a total concentration of said at least one ejection port in said trailing edge face; and
   wherein said at least one passage is configured to eject coolant in a direction that impinges an exposed surface of a blade outer air seal.

2. The vane of claim 1, wherein said localized cooling region is evenly distributed about said cooling plane.

3. The vane of claim 1, wherein each of said localized concentration and said total concentration is defined as a total cross-sectional area of said at least one ejection port located in a respective one of said localized cooling region and said trailing edge face.

4. The vane of claim 1, wherein each surface of said trailing edge face adjacent said localized cooling region is free of any of said at least one ejection port.

5. The vane of claim 1, wherein said edge face includes a non-uniform distribution of said at least one ejection port across a span between said lateral faces.

6. The vane of claim 1, wherein said at least one passage defines a coolant axis perpendicular to said edge face.

7. The vane of claim 1, wherein said at least one passage defines a coolant axis intersecting said edge face at an acute angle.

8. The vane of claim 1, wherein said at least one ejection port defines a rectangular cross section.

9. The vane of claim 1, wherein:
   said axial direction is defined by a vector extending from said trailing edge of said airfoil, said vector corresponding to a direction of fluid flow generated by said airfoil in operation;
   said platform defines a plenum configured to receive coolant from a coolant source;
   said at least one ejection port is a plurality of ejection ports; and
   said at least one passage is a plurality of passages, each passage of said plurality of passages extending between said plenum and a respective one of said plurality of ejection ports.

10. The vane of claim 9, wherein:
    each of said plurality of passages defines a respective coolant axis intersecting said trailing edge face at an acute angle; and
    each of said localized concentration and said total concentration is defined as a total cross-sectional area of said at least one ejection port located in a respective one of said localized cooling region and said trailing edge face.

11. The vane of claim 10, wherein each surface of said trailing edge face adjacent said localized cooling region is free of any ejection ports.

12. The vane of claim 10, wherein said localized cooling region is evenly distributed about said cooling plane.

13. The vane of claim 10, wherein said edge face includes a non-uniform distribution of said plurality of ejection ports across a span between said lateral faces.

14. The vane of claim 10, wherein said platform defines a plurality of recesses along said trailing edge face, and each of said plurality of ejection ports extends inwardly from a respective one of said plurality of recesses.

15. The vane of claim 10, wherein said platform is dimensioned such that each one of said lateral faces is circumferentially misaligned with lateral faces of said blade outer air seal, but said trailing edge face is circumferentially aligned with one of said lateral faces of said blade outer air seal in an installed position.

16. The vane of claim 15, wherein said plurality of ejection ports are distributed such that coolant is ejected onto a targeted region of said blade outer air seal, said targeted region defining a cooling width less than one-half a segment width defined by said lateral edges of said blade outer air seal.

17. An assembly for a gas turbine engine comprising:
    an array of blade outer air seals arranged about a longitudinal axis to bound a gas path;
    an array of vanes arranged about said longitudinal axis, wherein each vane of said array of vanes comprises:
        a platform extending in an axial direction between a leading edge face and a trailing edge face relative to said longitudinal axis, and extending in a circumferential direction between spaced apart lateral faces relative to said longitudinal axis;

an airfoil extending in a radial direction from said platform relative to said longitudinal axis, said airfoil defining a leading edge and a trailing edge, and said airfoil defining pressure and suction sides;

wherein said platform includes at least one ejection port in at least one of said leading edge and trailing edge faces, and includes at least one passage connected to said at least one ejection port;

wherein said at least one of said leading edge and trailing edge faces defines a localized cooling region distributed about a cooling plane extending from said airfoil in said axial direction such that said cooling plane intersects said at least one of said leading edge and trailing edge faces, and a localized concentration of said at least one ejection port in said localized cooling region being greater than a total concentration of said at least one ejection port in said at least one of said leading edge and trailing edge faces; and wherein said at least one passage is configured to eject coolant in a direction that impinges an exposed surface of a respective one of said array of blade outer air seals.

18. The assembly of claim 17, wherein said at least one of said leading edge and trailing edge faces is said trailing edge face.

19. The assembly of claim 18, wherein each blade outer air seal of said array of blade outer air seals extends in said circumferential direction between opposed mate faces, and said platform is dimensioned such that each one of said lateral faces of said platform is circumferentially misaligned with each and every one of said mate faces of said array of blade outer air seals, but said trailing edge face is circumferentially aligned with one of said mate faces of said array of blade outer air seals in an installed position.

20. The assembly of claim 19, wherein said cooling plane extends in said axial direction from said trailing edge such that said cooling plane intersects said trailing edge face.

* * * * *